United States Patent
Li et al.

(10) Patent No.: US 11,159,020 B2
(45) Date of Patent: Oct. 26, 2021

(54) HYBRID DYNAMIC DEMAND CONTROL FOR POWER SYSTEM FREQUENCY REGULATION

(71) Applicant: University of Tennessee Research Foundation, Knoxville, TN (US)

(72) Inventors: Fangxing Li, Knoxville, TN (US); Qingxin Shi, Knoxville, TN (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 538 days.

(21) Appl. No.: 15/893,076

(22) Filed: Feb. 9, 2018

(65) Prior Publication Data
US 2019/0252882 A1   Aug. 15, 2019

(51) Int. Cl.
| | | |
|---|---|---|
| G05B 15/02 | (2006.01) | |
| H02J 3/14 | (2006.01) | |
| H02J 13/00 | (2006.01) | |
| H02J 3/38 | (2006.01) | |

(52) U.S. Cl.
CPC ............... *H02J 3/14* (2013.01); *G05B 15/02* (2013.01); *H02J 13/0075* (2013.01); *H02J 3/381* (2013.01); *H02J 2310/14* (2020.01)

(58) Field of Classification Search
CPC ...... H02J 3/14; H02J 13/0075; H02J 2310/14; H02J 3/381; G05B 15/02
See application file for complete search history.

(56) References Cited

U.S. PATENT DOCUMENTS

| | | | | |
|---|---|---|---|---|
| 7,149,605 | B2* | 12/2006 | Chassin ................... | H02J 3/14 700/295 |
| 8,201,000 | B2* | 6/2012 | Boss ........................ | G06F 1/28 713/320 |
| 2004/0190211 | A1* | 9/2004 | Ockert ..................... | H02H 3/24 361/92 |
| 2007/0021874 | A1* | 1/2007 | Rognli ............... | G06Q 30/0207 700/295 |
| 2010/0070103 | A1* | 3/2010 | Fleck ........................ | H02J 3/14 700/296 |
| 2010/0072817 | A1* | 3/2010 | Hirst ......................... | H02J 3/24 307/31 |
| 2010/0218006 | A1* | 8/2010 | Boss ..................... | G06F 1/3203 713/300 |
| 2010/0244563 | A1* | 9/2010 | Fleck ........................ | H02J 3/14 307/35 |
| 2012/0110050 | A1* | 5/2012 | Shah ...................... | G01R 21/00 708/250 |
| 2013/0033234 | A1* | 2/2013 | Koritarov ................. | H02J 7/04 320/137 |

(Continued)

*Primary Examiner* — Thomas C Lee
*Assistant Examiner* — Gary Collins
(74) *Attorney, Agent, or Firm* — Myers Bigel, P.A

(57) ABSTRACT

A method includes performing by a local processor corresponding to a power consumer: detecting a power system frequency that is less than a low frequency threshold, receiving a ratio of a power demand reduction goal to a total responsive load from a power grid management processor, determining a portion of all of the appliances that are managed by the power consumer to be deactivated based on the ratio responsive to detecting the power system frequency being less than the low frequency threshold, and deactivating respective ones of the portion of appliances based on the ratio.

18 Claims, 5 Drawing Sheets

(56) References Cited

U.S. PATENT DOCUMENTS

| | | | | |
|---|---|---|---|---|
| 2013/0231793 | A1* | 9/2013 | Elliott | G05B 15/02 |
| | | | | 700/292 |
| 2013/0321040 | A1* | 12/2013 | Johal | H02J 3/24 |
| | | | | 327/113 |
| 2014/0236377 | A1* | 8/2014 | Joko | G06Q 50/06 |
| | | | | 700/295 |
| 2014/0246925 | A1* | 9/2014 | Porter | H02J 3/14 |
| | | | | 307/115 |
| 2015/0112501 | A1* | 4/2015 | Rombouts | H02J 3/14 |
| | | | | 700/295 |
| 2015/0244172 | A1* | 8/2015 | Trudel | H02J 3/14 |
| | | | | 307/129 |
| 2016/0013646 | A1* | 1/2016 | Akerson | H02J 13/00004 |
| | | | | 307/39 |
| 2016/0233677 | A1* | 8/2016 | Douglass | H02J 3/14 |
| 2017/0033560 | A1* | 2/2017 | Berdner | H02J 13/00004 |
| 2018/0159327 | A1* | 6/2018 | Fidigatti | H02J 3/38 |
| 2019/0027933 | A1* | 1/2019 | Lian | H02J 3/00 |

* cited by examiner

HYBRID DYNAMIC DEMAND CONTROL FOR POWER SYSTEM FREQUENCY REGULATION

STATEMENT REGARDING FEDERALLY SPONSORED RESEARCH OR DEVELOPMENT

This invention was made with government support under contract number NSF EEC-1041877 awarded by the National Science Foundation. The government has certain rights in the invention.

BACKGROUND

The present disclosure relates to power systems, and, in particular, to frequency regulation of power systems.

In recent years, the rapid increase in Distributed Energy Resources (DERs), such as wind generators, photovoltaic systems, and/or batteries, may result in a mismatch between the power generation output from a main or public power grid and load demand due to the intermittent power generation capabilities of many DERs. Traditionally, when the power demands from consumers exceed the power output from the main power grid, utilities would increase the spinning reserve from the conventional generators. Such an approach can be costly, however, as large power generators may be inefficient to adjust their output to dynamic changes in load demand.

SUMMARY

In some embodiments of the inventive subject matter, a method comprises, performing by a local processor corresponding to a power consumer: detecting a power system frequency that is less than a low frequency threshold, receiving a ratio of a power demand reduction goal to a total responsive load from a power grid management processor, determining a portion of all of the appliances that are managed by the power consumer to be deactivated based on the ratio responsive to detecting the power system frequency being less than the low frequency threshold, and deactivating respective ones of the portion of appliances based on the ratio.

In other embodiments, determining the portion of appliances that are managed by the power consumer to be deactivated based on the ratio comprises: associating respective ones of all of the appliances with a random variable X having respective values that are uniformly distributed over the interval 0 to 1. The random variable X is less than or equal to the ratio for the portion of appliances that are managed by the power consumer to be deactivated.

In still other embodiments, deactivating respective ones of the portion of appliances based on the ratio comprises: associating respective time delays with respective ones of the portion of appliances and deactivating respective ones of the portion of appliances based on the ratio and based on the respective time delays.

In still other embodiments, associating respective time delays with respective ones of the portion of appliances comprises: defining a maximum time delay Tmax. Respective ones of the time delays correspond to a random variable T that has respective values uniformly distributed over the interval 0 to Tmax.

In still other embodiments, the low frequency threshold is a first low frequency threshold and the method further comprises: estimating whether the power system frequency will drop below a second low frequency threshold responsive to detecting the power system frequency being less than the first low frequency threshold. The second low frequency threshold is less than the first low frequency threshold.

In still other embodiments, deactivating respective ones of the portion of appliances based on the ratio comprises: deactivating respective ones of the portion of appliances based on the ratio in parallel when the power system frequency is detected to drop below the second low frequency threshold.

In still other embodiments, detecting the power system frequency being less than the low frequency threshold comprises: sampling the power system frequency over a defined time interval.

In still other embodiments, the power demand reduction goal is based on a load sensitivity factor ratio of power to frequency deviation.

In some embodiments of the inventive subject matter, a system comprises: a processor corresponding to a power consumer and a memory coupled to the processor and comprising computer readable program code embodied in the memory that is executable by the processor to perform operations comprising: detecting a power system frequency that is less than a low frequency threshold, receiving a ratio of a power demand reduction goal to a total responsive load from a power grid management processor, determining a portion of all of the appliances that are managed by the power consumer to be deactivated based on the ratio responsive to detecting the power system frequency being less than the low frequency threshold, and deactivating respective ones of the portion of appliances based on the ratio.

In further embodiments, determining the portion of appliances that are managed by the power consumer to be deactivated based on the ratio comprises: associating respective ones of all of the appliances with a random variable X having respective values that are uniformly distributed over the interval 0 to 1. The random variable X is less than or equal to the ratio for the portion of appliances that are managed by the power consumer to be deactivated.

In still further embodiments, deactivating respective ones of the portion of appliances based on the ratio comprises: associating respective time delays with respective ones of the portion of appliances and deactivating respective ones of the portion of appliances based on the ratio and based on the respective time delays.

In still further embodiments, associating respective time delays with respective ones of the portion of appliances comprises: defining a maximum time delay Tmax. Respective ones of the time delays correspond to a random variable T that has respective values uniformly distributed over the interval 0 to Tmax.

In still further embodiments, the low frequency threshold is a first low frequency threshold and the operations further comprise: estimating whether the power system frequency will drop below a second low frequency threshold responsive to detecting the power system frequency being less than the first low frequency threshold. The second low frequency threshold is less than the first low frequency threshold.

In still further embodiments, deactivating respective ones of the portion of appliances based on the ratio comprises: deactivating respective ones of the portion of appliances based on the ratio in parallel when the power system frequency is detected to drop below the second low frequency threshold.

In still further embodiments, the power demand reduction goal is based on a load sensitivity factor ratio of power to frequency deviation.

In some embodiments of the inventive subject matter, a computer program product comprises a tangible computer readable storage medium comprising computer readable program code embodied in the medium that is executable by a processor corresponding to a power consumer to perform operations comprising: detecting a power system frequency that is less than a low frequency threshold, receiving a ratio of a power demand reduction goal to a total responsive lead from a power grid management processor, determining a portion of all of the appliances that are managed by the power consumer to be deactivated based on the ratio responsive to detecting the power system frequency being less than the low frequency threshold, and deactivating respective ones of the portion of appliances based on the ratio.

In other embodiments, determining the portion of appliances that are managed by the power consumer to be deactivated based on the ratio comprises: associating respective ones of all of the appliances with a random variable X having respective values that are uniformly distributed over the interval 0 to 1. The random variable X is less than or equal to the ratio for the portion of appliances that are managed by the power consumer to be deactivated.

In still other embodiments, deactivating respective ones of the portion of appliances based on the ratio comprises: associating respective time delays with respective ones of the portion of appliances and deactivating respective ones of the portion of appliances based on the ratio and based on the respective time delays.

In still other embodiments, the low frequency threshold is a first low frequency threshold and the operations further comprise: estimating whether the power system frequency will drop below a second low frequency threshold responsive to detecting the power system frequency being less than the first low frequency threshold. The second low frequency threshold is less than the first low frequency threshold.

In still other embodiments, deactivating respective ones of the portion of appliances based on the ratio comprises: deactivating respective ones of the portion of appliances based on the ratio in parallel when the power system frequency is detected to drop below the second low frequency threshold.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
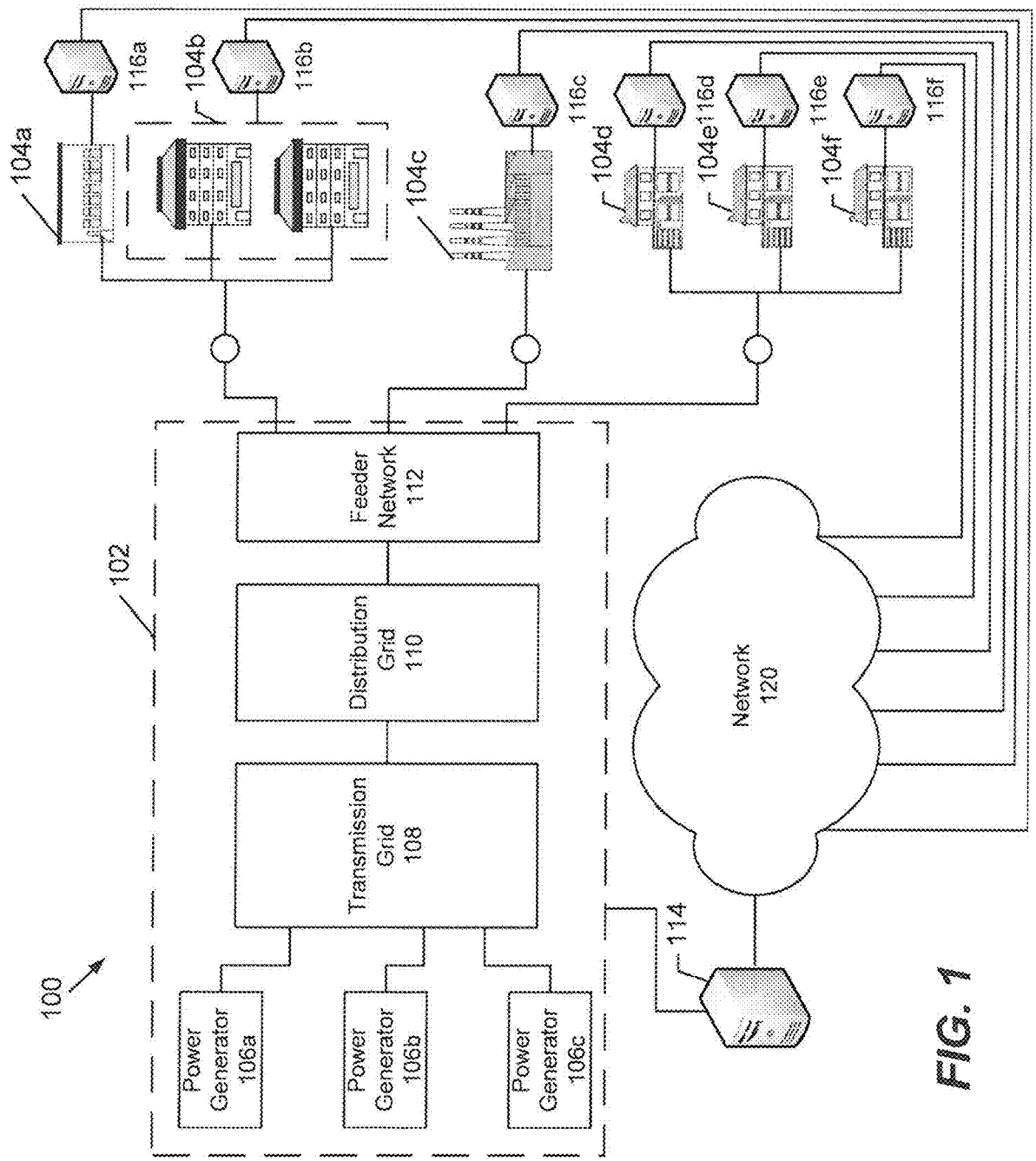
FIG. 1 is a block diagram that illustrates a power distribution network including a hybrid dynamic demand capability for power system frequency regulation in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "data processing facility" includes, but it is not limited to, a hardware element, firmware component, and/or software component. A data processing system may be configured with one or more data processing facilities.

As used herein, the term "appliance" refers to any system, device, apparatus, or the like that consumes power and is responsive to control commands generated by a local processor or server. Multiple appliances may be managed by a single local processor or server.

Some embodiments of the inventive subject matter stem from a realization that individual power consumers may dynamically regulate power demand in ways that are more efficient than adjusting the power output of large power generators in a main power grid. For example, a local processor associated with a power consumer and has control over the appliances used at the consumer's facility may detect an overload condition through a drop in the frequency of a power signal on a power line, i.e., the power system frequency, that serves the facility. A power grid management processor, such as the Distribution Management System (DMS) of the main power grid, has information about the total responsive load across all consumers driven by a power generator and also the load-frequency sensitivity factor for the power generator. The load-frequency sensitivity factor defines the relationship between change in power system frequency at the local bus serving a power consumer and change in power output from the generator. For example, the load-frequency sensitivity factor may be 200 MW for every 1 Hz drop in frequency. This means that for every 1 Hz drop in frequency from the desired baseline of 60 Hz, the power generator needs to generate an additional 200 MW of power or the power demand needs to be reduced by 200 MW to return to the desired baseline of 60 Hz. Based on the drop in frequency, the power grid management processor may determine a power demand reduction goal, which can be communicated along with the total responsive load across all consumers to the local processors associated with each of the power consumers, respectively. The ratio of the power demand reduction goal to the total responsive load may be used to determine a portion of the appliances that are managed by the local processor of a particular consumer to be deactivated. Thus, by adjusting the power demand from individual consumers during an overload condition, the costs associated with increasing the power output from a power generator in a main power grid may be avoided. Moreover, by reducing the demand at consumer locations as opposed to increasing the power output from power generators in response to a drop in power system frequency, fossil fuel consumption can be reduced.

Referring to FIG. 1, a power distribution network 100 including a hybrid demand capability for power system frequency regulation, in accordance with some embodiments of the inventive subject matter, comprises a main power grid 102, which is typically operated by a public or private utility, and which provides power to various power consumers 104a, 104b, 104c, 104d, 104e, and 104f. The electrical power generators 106a, 106b, and 106c are typically located near a fuel source, at a dam site, and/or at a site often remote from heavily populated areas. The power generators 106a, 106b, and 106c may be nuclear reactors, coal burning plants, hydroelectric plants, and/or other suitable facility for generating bulk electrical power. The power output from the power generators 106, 106b, and 106c is carried via a transmission grid or transmission network over potentially long distances at relatively high voltage levels. A distribution grid 110 may comprise multiple substations, which receive the power front the transmission grid 108 and step the power down to a lower voltage level for further distribution. A feeder network 112 distributes the power from the distribution grid 110 substations to the power consumers 104a, 104b, 104c, 104d, 104e, and 104f. The power substations 110 in the distribution grid may step down the voltage level when providing, the power to the power consumers 104a, 104b, 104c, 104d, 104e, and 104f through the feeder network 112.

As shown in FIG. 1, the power consumers 104a, 104b, 104c, 104d, 104e, and 104f may include a variety of types of facilities including, but not limited to, a warehouse 104a, a multi-building office complex 104b, a factory 104c, and residential homes 104d, 104e, and 104f. A feeder circuit may connect a single facility to the main power grid 102 as in the case of the factory 104c or multiple facilities to the main power grid 102 as in the case of the warehouse 104a and office complex 104b and also residential homes 104d, 104e, and 104f. Although only six power consumers are shown in FIG. 1, it will be understood that a feeder network 112 may service hundreds or thousands of power consumers.

The power distribution network 100 further comprises a DMS 114, which may monitor and control the generation and distribution of power via the main power grid 102. The DMS 114 may comprise a collection of processors and/or servers operating in various portions of the main power grid 102 to enable operating personnel to monitor and control the main power grid 102. The DMS 114 may further include other monitoring and/or management systems for use in supervising the main power grid 102. One such system is known as the Supervisory Control and Data Acquisition (SCADA) system, which is a control system architecture that uses computers, networked data communications, and graphical user interfaces for high-level process supervisory management of the main power grid.

According to some embodiments of the inventive subject matter, each of the power consumers 104a, 104b, 104c, 104d, 104e, and 104f may have a local processor 116a, 116b, 116c, 116d, 116e, and 116f associated therewith, respectively. A power consumer 104 may use the local processor 116 to manage the appliances that consume power at the power consumer's facility. Moreover, each local processor 116a, 116b, 116c, 116d, 116e, and 116f may be configured to monitor the frequency of the power signal provided to its associated facility to detect a possible overload condition. Power is typically delivered to consumers using a frequency of approximately 60 Hz. When a local processor 116 detects a drop in the power system frequency from the desired 60 Hz, the local processor 116 may communicate with the DMS 114 to obtain loading parameter values that can be used to deactivate one or more appliances under control of the local processor 116 at a consumer facility.

The local processors 116a, 116b, 116c, 116d, 116e, and 116f may communicate with the DMS 114 over the network 120. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates an exemplary a power distribution network 100 including a hybrid demand capability for power system frequency regulation, it will be understood that embodiments of the inventive subject matter are not limited to such configurations, but are intended to encompass any configuration capable of carrying out the operations described herein.

Figure 2:
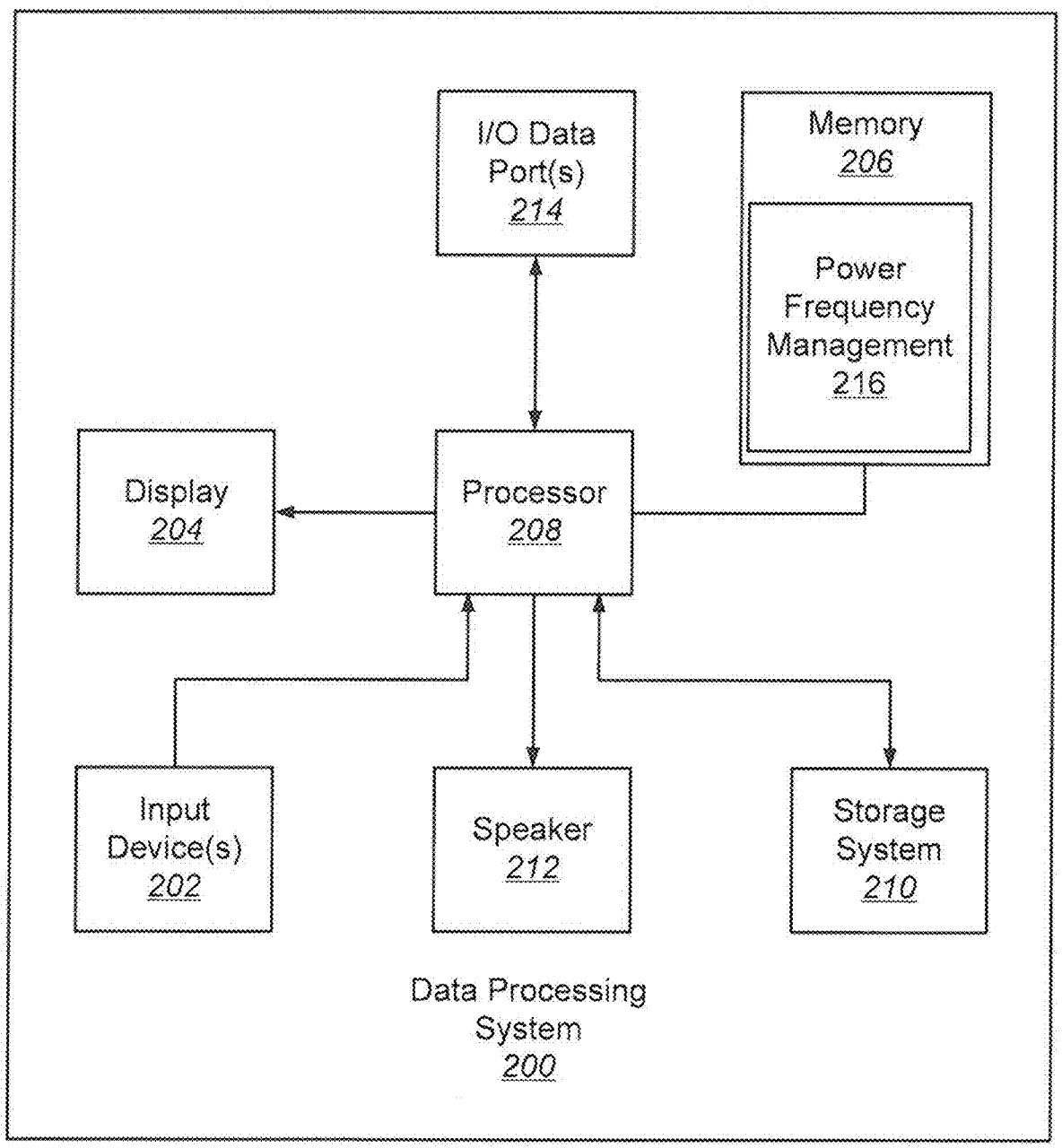
FIG. 2 illustrates a data processing system that may be used to implement a local processor associated with a power consumer of FIG. 1 in accordance with some embodiments of the inventive subject matter.

Referring now to FIG. 2, a data processing system 200 that may be used to implement each of the local processors 116a, 116b, 116c, 116d, 116e, and 116f of FIG. 1, in accordance with some embodiments of the inventive subject matter, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a power frequency management module 216 that may provide functionality that may include, but is not limited to, adjusting the loading at a power consumer's facility responsive to and based on detecting a deviation, such as a drop, in the power system frequency at the facility in accordance with some embodiments of the inventive subject matter.

Figure 3:
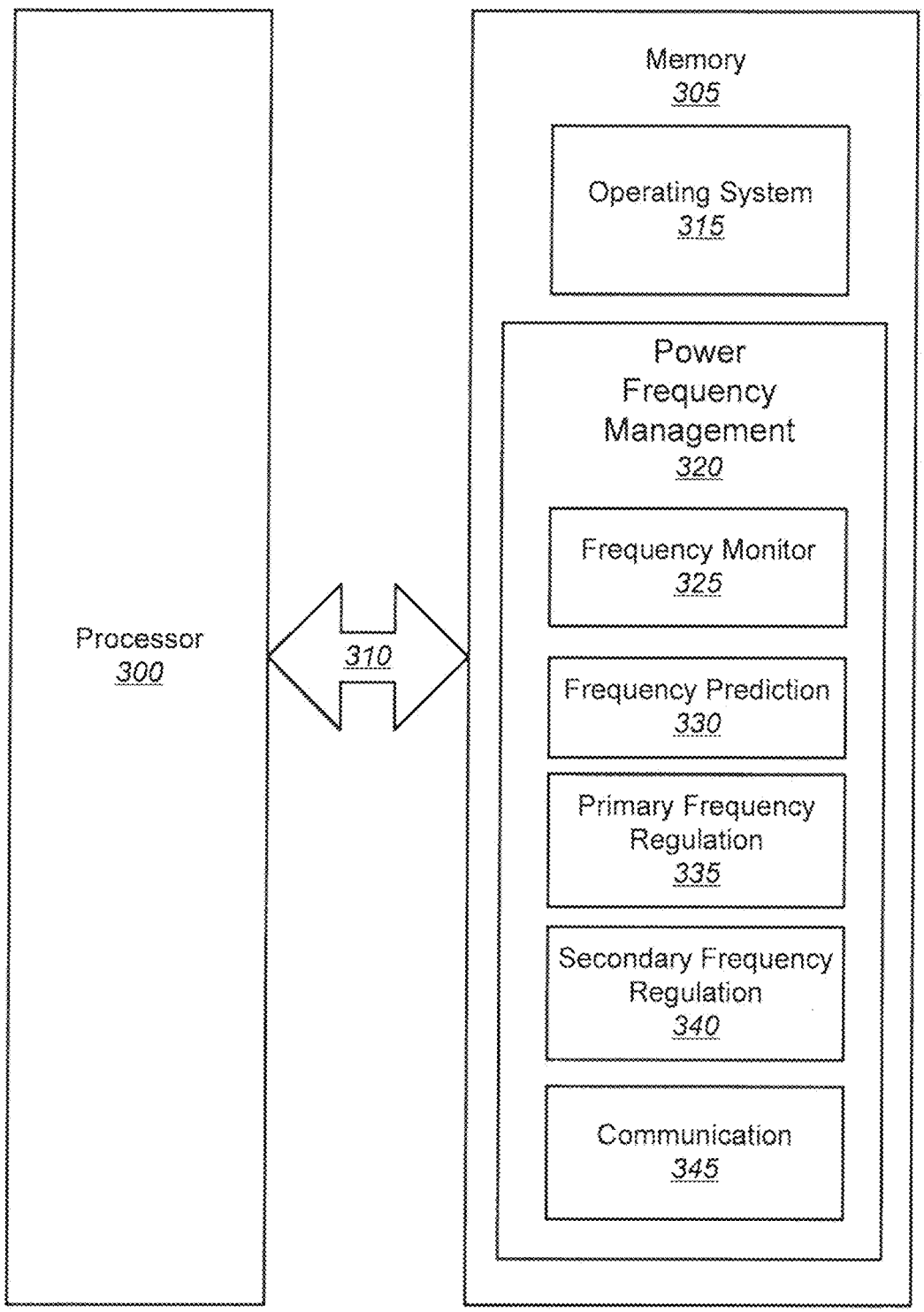
FIG. 3 is a block diagram that illustrates a software/hardware architecture for use in a local processor associated with a power consumer for adjusting power demand for power system frequency regulation in accordance with some embodiments of the inventive subject matter.

FIG. 3 illustrates a processor 300 and memory 305 that may be used in embodiments of data processing systems, such as the local processors 116a, 116b, 116c, 116d, 116e, and 116f of FIG. 1 and the data processing system 200 of FIG. 2, respectively, for adjusting power demand for power system frequency regulation in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for adjusting power demand for frequency regulation in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain two or more categories of software and/or data: an operating system 315 and a power frequency management module 320. In particular, the operating system 315 may manage the data processing system's software and/or hardware resources and may coordinate execution of programs by the processor 300. The power frequency management module 320 may comprise a frequency monitor module 325, a frequency prediction module 330, a primary frequency regulation module 335, a secondary frequency regulation module 340, and a communication module 345.

The frequency monitor module 325 may be configured to monitor the frequency of the power signal at a power consumer's 104a, 104b, 104c, 104d, 104e, and 104f facility. As described above, a power line signal is typically provided to a consumer facility at 60 Hz. Due to fluctuations in power provided by DERs, such as wind and photovoltaic sources, a main power grid 102 may experience overload conditions periodically, which may be manifest in a reduction or drop in the power system frequency provided at consumer facilities. The frequency monitor module 325 may detect frequency deviations from the desired 60 Hz in the power signal and may determine whether the deviations exceed one or more defined thresholds.

The frequency prediction module 330 may be configured to estimate a lowest or nadir frequency of the power line signal based on samples taken of the power line signal. The local processor 116 may respond to a drop in power system frequency differently depending on the magnitude of the frequency drop. The estimated nadir frequency may be compared with one or more frequency thresholds, which may form a basis for the type of response initiated by the local processor 116.

The primary frequency regulation module 335 may be configured to initiate a response to a drop in power system frequency when the frequency has already and/or is estimated by the frequency prediction module 330 to drop to a level that justifies a more rapid reduction in load by deactivating appliances under the control of the local processor 116 in parallel. In this case, there is less risk that the more immediate reduction in load will cause the power system frequency to overshoot to a level above the desired 60 Hz level.

The secondary frequency regulation module 340 may be configured to initiate a response to a drop in power system frequency when the frequency has already and/or is estimated by the frequency prediction module 330 to drop to a level that merits a less rapid reduction in load by deactivating appliances under the control of the local processor 116 in a staged manner over time. In this case, there is risk that a more immediate reduction in load will cause the power system frequency to overshoot to a level above the desired 60 Hz level. As a result, the appliances under the control of the local processor 116 are deactivated randomly over a defined time interval.

The communication module 345 may be configured to facilitate communication between a local processor 116a, 116b, 116c, 116d, 116e, and 116f and the DMS 114 of FIG. 1 over the network 120.

Although FIG. 3 illustrates hardware/software architectures that may be used in data processing systems, such as the local processors 116a, 116b, 116e, 116d, 116e, and 116f of FIG. 1 and the data processing system 200 of FIG. 2, respectively, for adjusting power demand for power system frequency regulation in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the local processors 116a, 116b, 116c, 116d, 116e, and 116f of FIG. 1, the data processing system 200 of FIG. 2, and the hardware/software architecture of FIG. 3, may each be implemented as a single processor system, a multi-processor system, a multi-core processor system, or even a network of stand alone computer systems, in accordance with various embodiments of the inventive subject matter. Each of these processor/computer systems may be referred to as, a "processor" or "data processing system."

The data processing apparatus of FIGS. 1-3 may be used to facilitate the adjustment of power demand for power system frequency regulation according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 206 coupled to the processor 208 and the memory 305 coupled to the processor 300 include computer readable program code that, when executed by the respective processors, causes the respective processors to perform operations including one or more of the operations described herein with respect to FIGS. 4-6.

Figure 4:
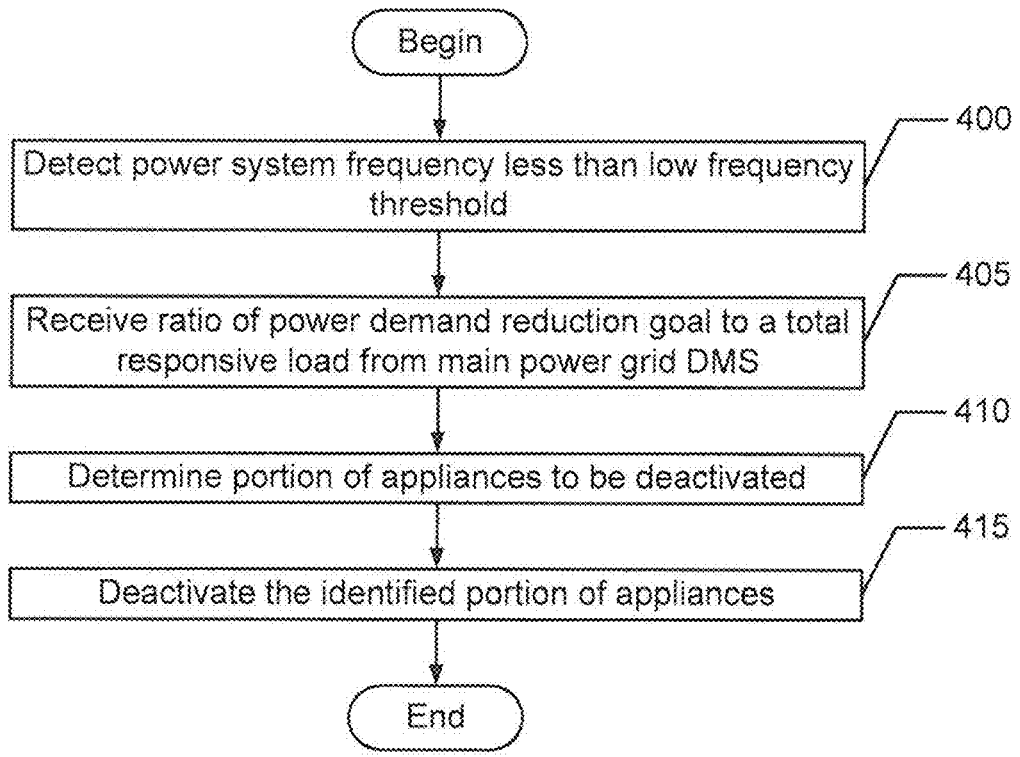
FIGS. 4 and 5 are flowchart diagrams that illustrate operations for adjusting power demand for power frequency regulation in accordance with some embodiments of the inventive subject matter.

FIG. 4 is a flowchart that illustrates operations for adjusting power demand for power frequency regulation in accordance with some embodiments of the inventive subject matter. Operations begin at block 400 where the frequency monitor module 325 detects a drop in the power system frequency below a low frequency threshold. In some embodiments, the frequency monitor module 325 may sample the power system frequency periodically at a first monitoring frequency, such as once every 1 second interval, Once the power system frequency has been detected to have dropped below the low frequency threshold, the frequency monitor module 325 may increase the monitoring frequency to sample the power system frequency at a second monitoring frequency, such as once every 0.1 second interval, over a defined sampling period. At the end of the sampling period, the frequency monitor module 325 may confirm that the frequency remains below the low frequency threshold. This avoids generating a response to momentary glitches in the frequency that may be quickly resolved without the need for load reduction.

At block 405, the local processor 116 corresponding to a power consumer receives the ratio of a load reduction goal to a total responsive load from the DMS 114. As described above, the DMS 114 has the load-frequency sensitivity factor for the power generator serving the power consumer experiencing a frequency deviation. Using the load-frequency sensitivity factor and the frequency deviation from a desired baseline frequency, e.g., 60 Hz, the load reduction goal can be calculated. For example, if the load-frequency sensitivity factor is 200 MW for every 1 Hz drop in frequency and the frequency deviation is 0.1 Hz, then the power demand reduction goal is 20 MW. The DMS 114 is also in possession of the aggregate load being driven by the power generator whose frequency has dropped. For example, the power generator may be driving an aggregate load of 200 MW, which typically spans multiple power consumers. The ratio of the power demand reduction goal to the total responsive load is, therefore, 20 MW/200 MW, which is 0.1 or 10%.

The power frequency management module 320 may determine at block 410 a portion of appliances managed by the power consumer to be deactivated in response to the frequency deviation. The determination of which appliances to be deactivated may be performed locally at the local processor 116 corresponding to a particular power consumer without the need to coordinate with the DMS 114 of the main power grid 102. The power frequency management module 320 may invoke the primary frequency regulation module 335 or the secondary frequency regulation module 340 to determine the portion of the appliances to be deactivated. This is based on the frequency deviation as will be described below with respect to FIG. 5. Independent of whether the primary frequency regulation module 335 or the secondary frequency regulation module 340 is invoked, both of these modules use a stochastic decision method (SDM) to determine the portion of appliances to be deactivated. In some embodiments, the primary frequency regulation module 335 or secondary frequency regulation module 340 associates each of the appliances with a random variable X having respective values that are uniformly distributed over the interval 0 to 1. When the random variable X is less than or equal to the ratio of the power demand reduction goal to the total responsive load, then the associated appliance is included in the portion of appliances to be deactivated. Thus, the probability that an appliance is deactivated may be expressed as follows:

$P_{off}=\min\{Ratio,1\}$

If $U(0,1) \leq P_{off}$, switch off

If $U(0,1) > P_{off}$, remain on where the Ratio is the ratio of the power demand reduction goal to the total responsive load. In the above example where the ratio is 0.1, each appliance managed by the local controller 116 of a power consumer has a 10% chance of being deactivated in response to the frequency deviation. This presumes, however, that each appliance presents the same load. If certain appliances provide more loading then other appliances at the power consumer's facility, then they may be weighted accordingly so that a number of appliances corresponding to 10% of the load at the power consumer's facility are selected for deactivation. In some embodiments, the selection of appliances for deactivation may be further refined by maintaining a history for each appliance. If an appliance has been deactivated more recently in response to the frequency deviation, then that appliance may be weighted less than an appliance that has been deactivated more distant in time or not at all to attempt to even out the frequency at which any given appliance participates in responding to a power demand adjustment due to the frequency deviation.

At block 415, the primary frequency regulation module 335 or secondary frequency regulation module 340 deactivates the identified portion of appliances to be deactivated to adjust the power demand for the power consumer's facility. The manner in which the appliances are deactivated depends on whether the deactivation is managed by the primary frequency regulation module 335 or the secondary frequency regulation module 340, which is described below with reference to FIG. 5

Figure 5:
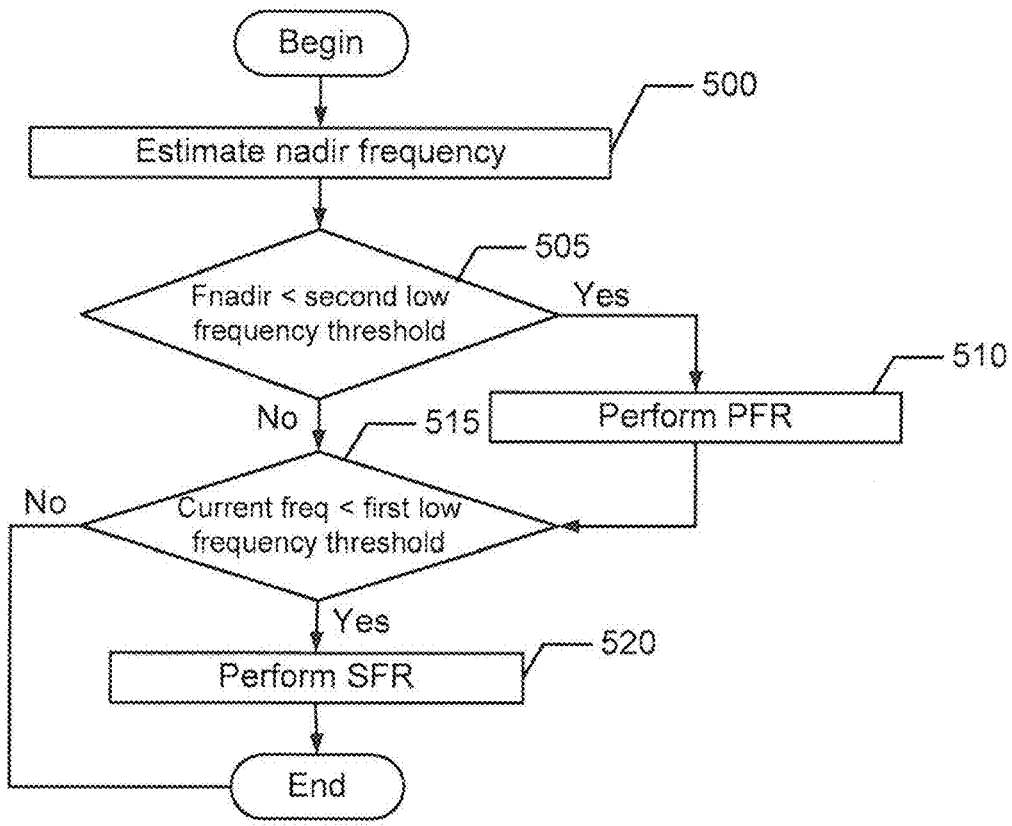

Referring now to FIG. 5, the power frequency management module 320 may use at least two different low frequency thresholds. A first low frequency threshold may be used to trigger secondary frequency regulation using the secondary frequency regulation module 340 and a second low frequency threshold, which is lower than the first low frequency threshold, may be used to trigger primary frequency regulation using the primary frequency regulation module 335. For example, the first low frequency threshold may be 59.95 Hz and the second low frequency threshold may be 59.75 Hz. As described above with respect to block 400 of FIG. 4, the frequency monitor module 325 may sample the frequency periodically and may determine whether the power system frequency has fallen below the first low frequency threshold. The frequency monitor module 325 may use the collected samples to estimate the nadir frequency (i.e., estimated lowest frequency) for the power line signal at block 500. If the nadir frequency predicted to be or is already lower than the second low frequency threshold as determined at block 505, then the primary frequency regulation module 335 may perform primary frequency regulation at block 510 by determining the portion of appliances to be deactivated and deactivating the identified portion of appliances as described above with respect to blocks 410 and 415. Because the frequency is below the second low frequency threshold and there is little risk that a reduction of load will cause the frequency to overshoot to a level above the desired 60 Hz level, the primary frequency regulation module 335 may deactivate the portion of appliances that have been selected for deactivation in parallel to the extent possible without inserting intentional delays between deactivation of various ones of the appliances.

After performing primary frequency regulation at block 510 or if the nadir frequency was not less than the second low frequency threshold, operations continue at block 515 where a determination is made whether the current frequency is less than the first low frequency threshold. This determination may be made after waiting for a specified time interval so that the frequency stabilizes after performing primary frequency regulation at block 510. If the current frequency is less than the first low frequency threshold as determined at block 515, then the secondary frequency regulation module 340 may perform secondary frequency regulation at block 520 by determining the portion of appliances to be deactivated and deactivating these appliances as described above with respect to blocks 410 and 415. Because the frequency of the power line signal is relatively close to the desired 60 Hz level, there is risk that an immediate reduction in load will cause the power system frequency to overshoot to a level above the desired 60 Hz level. As a result, the appliances under the control of the local processor 116 are deactivated randomly and/or in a staggered manner over a defined time interval.

Figure 6:
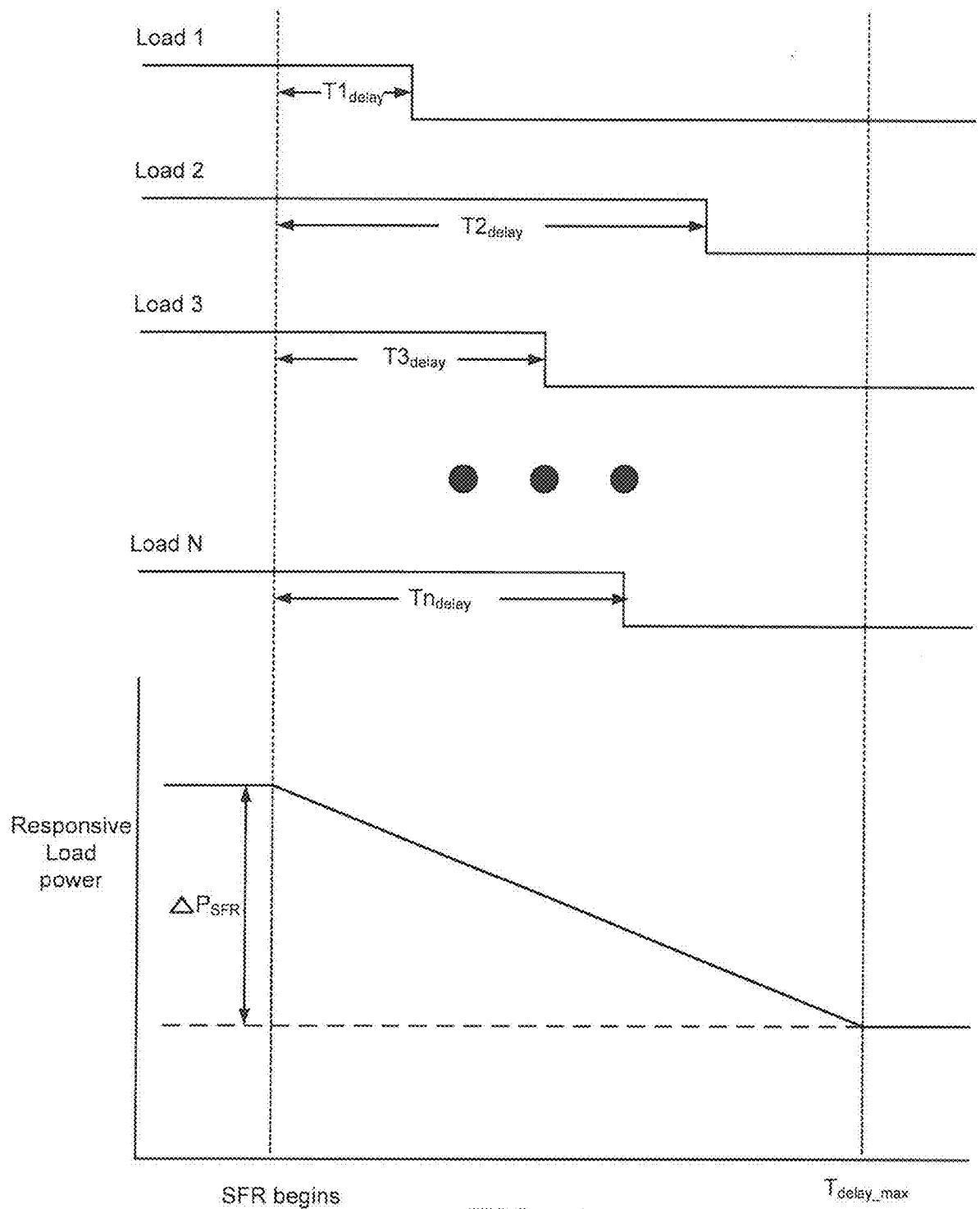
FIG. 6 is a graph that illustrates a staged deactivation of appliances in accordance with some embodiments of the inventive subject matter.

Referring now to FIG. 6, the secondary frequency regulation module 340 may associate respective time delays with respective ones of the portion of appliances to be deactivated. A maximum time delay $T_{delay\_max}$ may be defined and respective ones of the time delays may be associated with a random variable T that has respective values that are uniformly distributed over the interval 0 to $T_{delay\_max}$. This is illustrated FIG. 6 with each Load 1 through N corresponding to a respective appliance to be deactivated over the interval when secondary frequency regulation begins (time=0) through time $T_{delay\_max}$. Each appliance is deactivated via an SDM using a random process within this time interval such that the delays are uniformly distributed across the interval. The delay for any given appliance may be given as follows with i denoting a particular one of N appliances to be deactivated:

$$T_{i\_delay} \sim U(0, T_{delay\_max}), \text{ where } 1 \leq i \leq N$$

As shown in FIG. 6, this results in a generally linear reduction in load power over the interval $T_{delay\_max}$. Similar to the ones of the appliances for deactivation described above with respect to block 410 of FIG. 4, the random and uniform distribution of delays presumes that the appliances have equal rated power. If the appliances to be deactivated have unequal rated power, then they may be weighted differently to ensure that the amount of load deactivated over time through the interval $T_{delay\_max}$ is represented as a random process with a uniform distribution.

Embodiments of the inventive subject matter may provide a hybrid approach for power system frequency regulation with the bulk of the operations managed by a power consumer's local controller and the DMS of a main power grid providing global information, such as a ratio of a power demand reduction goal to total responsive load. The DMS may provide or broadcast this information to all power consumers responsive to the frequency deviation associated with the power generator serving the consumers. Accordingly, relatively little communication may be needed between the DMS of the main power grid and the local controllers associated with the power consumers. According to some embodiments of the inventive subject matter, the local controllers may tailor the response of the load reduction probability based on the magnitude of the frequency deviation. For more substantial frequency deviation events, primary frequency regulation may be performed to deactivate identified stochastically selected appliances in parallel without inserting artificial delays between the deactivations. For more minor frequency deviation events, secondary frequency regulation may be performed such that the stochastically selected appliances are deactivated in a staged manner with the deactivation delays assigned to the respective appliances likewise being stochastically determined. Embodiments of the inventive subject matter may, therefore, provide a relatively cost efficient and timely approach to managing frequency regulation in a power system delivery network by avoiding the costs associated with increasing power input from a power generator in the main power grid due to loss of power from DERs or other reasons. The approach may also have the added benefit of reducing fossil fuel consumption by addressing the overload condition from the power demand side as opposed to increasing power generation on the supply side.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   performing by a local processor corresponding to a power consumer:
   detecting a power system frequency that is less than a first low frequency threshold;
   receiving a ratio of a power demand reduction goal to a total responsive load from a power grid management processor;
   determining a portion of all appliances that are managed by the power consumer to be deactivated based on the ratio responsive to detecting the power system frequency being less than the first low frequency threshold; and
   deactivating respective ones of the portion of appliances in serial fashion separated in time based on the ratio when the power system frequency is less than the first low frequency threshold, but not less than a second low frequency threshold; and
   deactivating respective ones of the portion of appliances in parallel fashion without inserting time delays to create time separation when the power system frequency is less than the second low frequency threshold, the second low frequency threshold being less than the first low frequency threshold.

2. The method of claim 1, wherein determining the portion of appliances that are managed by the power consumer to be deactivated based on the ratio comprises:

associating respective ones of all of the appliances with a random variable X having respective values that are uniformly distributed over the interval 0 to 1;
wherein the random variable X is less than or equal to the ratio for the portion of appliances that are managed by the power consumer to be deactivated.

3. The method of claim 2, wherein deactivating respective ones of the portion of appliances in serial fashion separated in time based on the ratio comprises:
associating the respective time delays with respective ones of the portion of appliances; and
deactivating respective ones of the portion of appliances based on the ratio and based on the respective time delays.

4. The method of claim 3, wherein associating respective time delays with respective ones of the portion of appliances comprises:
defining a maximum time delay Tmax;
wherein respective ones of the time delays correspond to a random variable T that has respective values uniformly distributed over the interval 0 to Tmax.

5. The method of claim 1, wherein detecting the power system frequency being less than the first low frequency threshold comprises:
sampling the power system frequency over a defined time interval.

6. The method of claim 1, wherein the power demand reduction goal is based on a load sensitivity factor ratio of power to frequency deviation.

7. A system, comprising:
a processor corresponding to a power consumer; and
a memory coupled to the processor and comprising computer readable program code embodied in the memory that is executable by the processor to perform operations comprising:
detecting a power system frequency that is less than a first low frequency threshold;
receiving a ratio of a power demand reduction goal to a total responsive load from a power grid management processor;
determining a portion of all appliances that are managed by the power consumer to be deactivated based on the ratio responsive to detecting the power system frequency being less than the first low frequency threshold; and
deactivating respective ones of the portion of appliances in serial fashion separated in time based on the ratio when the power system frequency is less than the first low frequency threshold, but not less than a second low frequency threshold; and
deactivating respective ones of the portion of appliances in parallel fashion without inserting time delays to create time separation when the power system frequency is less than the second low frequency threshold, the second low frequency threshold being less than the first low frequency threshold.

8. The system of claim 7, wherein determining the portion of appliances that are managed by the power consumer to be deactivated based on the ratio comprises:
associating respective ones of all of the appliances with a random variable X having respective values that are uniformly distributed over the interval 0 to 1;
wherein the random variable X is less than or equal to the ratio for the portion of appliances that are managed by the power consumer to be deactivated.

9. The system of claim 8, wherein deactivating respective ones of the portion of appliances in serial fashion separated in time based on the ratio comprises:
associating the respective time delays with respective ones of the portion of appliances; and
deactivating respective ones of the portion of appliances based on the ratio and based on the respective time delays.

10. The system of claim 9, wherein associating respective time delays with respective ones of the portion of appliances comprises:
defining a maximum time delay Tmax;
wherein respective ones of the time delays correspond to a random variable T that has respective values uniformly distributed over the interval 0 to Tmax.

11. The system of claim 7, wherein the power demand reduction goal is based on a load sensitivity factor ratio of power to frequency deviation.

12. The system of claim 7, wherein detecting the power system frequency being less than the first low frequency threshold comprises:
sampling the power system frequency over a defined time interval.

13. A computer program product comprising:
a non-transitory computer readable storage medium comprising computer readable program code embodied in the medium that is executable by a processor corresponding to a power consumer to perform operations comprising:
detecting a power system frequency that is less than a first low frequency threshold;
receiving a ratio of a power demand reduction goal to a total responsive load from a power grid management processor;
determining a portion of all appliances that are managed by the power consumer to be deactivated based on the ratio responsive to detecting the power system frequency being less than the first low frequency threshold; and
deactivating respective ones of the portion of appliances in serial fashion separated in time based on the ratio when the power system frequency is less than the first low frequency threshold, but not less than a second low frequency threshold; and
deactivating respective ones of the portion of appliances in parallel fashion without inserting time delays to create time separation when the power system frequency is less than the second low frequency threshold, the second low frequency threshold being less than the first low frequency threshold.

14. The computer program product of claim 13, wherein determining the portion of appliances that are managed by the power consumer to be deactivated based on the ratio comprises:
associating respective ones of all of the appliances with a random variable X having respective values that are uniformly distributed over the interval 0 to 1;
wherein the random variable X is less than or equal to the ratio for the portion of appliances that are managed by the power consumer to be deactivated.

15. The computer program product of claim 14, wherein deactivating respective ones of the portion of appliances in serial fashion separated in time based on the ratio comprises:
associating the respective time delays with respective ones of the portion of appliances; and deactivating respective ones of the portion of appliances based on the ratio and based on the respective time delays.

16. The computer program product of claim 15, wherein associating respective time delays with respective ones of the portion of appliances comprises:

defining a maximum time delay Tmax;

wherein respective ones of the time delays correspond to a random variable T that has respective values uniformly distributed over the interval 0 to Tmax.

17. The computer program product of claim 13, wherein detecting the power system frequency being less than the first low frequency threshold comprises:

sampling the power system frequency over a defined time interval.

18. The computer program product of claim 13, wherein the power demand reduction goal is based on a load sensitivity factor ratio of power to frequency deviation.

* * * * *